May 26, 1925.  1,539,066

F. D. ADAMY

NONCLOG COLTER

Filed March 19, 1924  2 Sheets-Sheet 1

Inventor
F. D. Adamy
By Philip A. H. Terrell
Attorney

May 26, 1925.
F. D. ADAMY
NONCLOG COLTER
Filed March 19, 1924
1,539,066
2 Sheets-Sheet 2
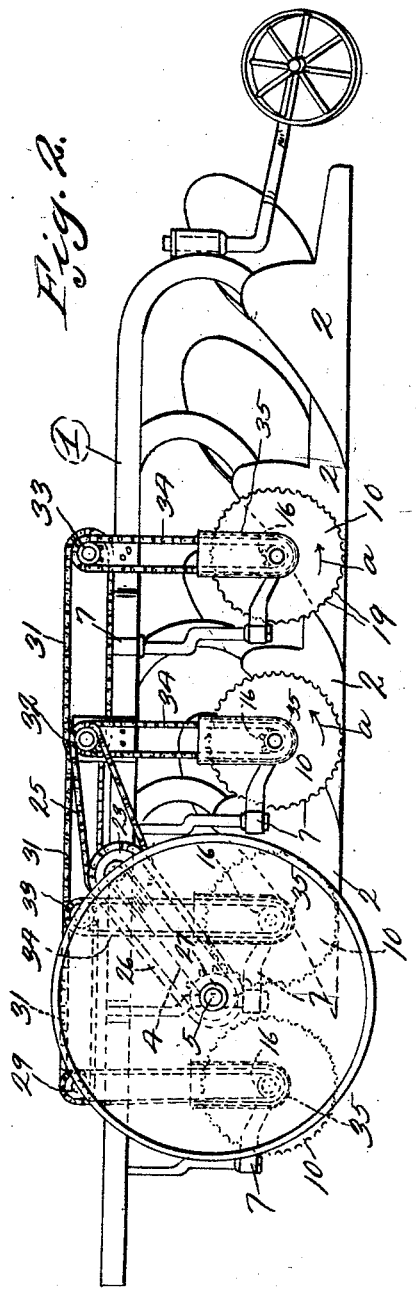
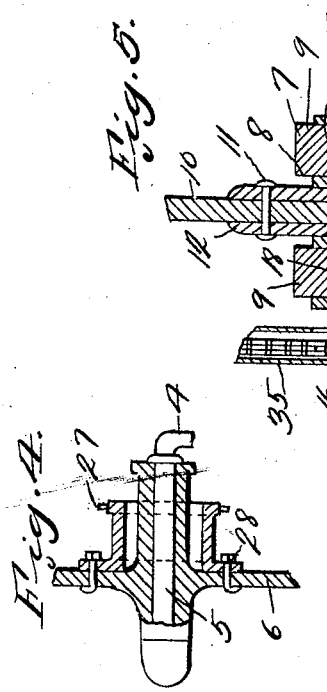
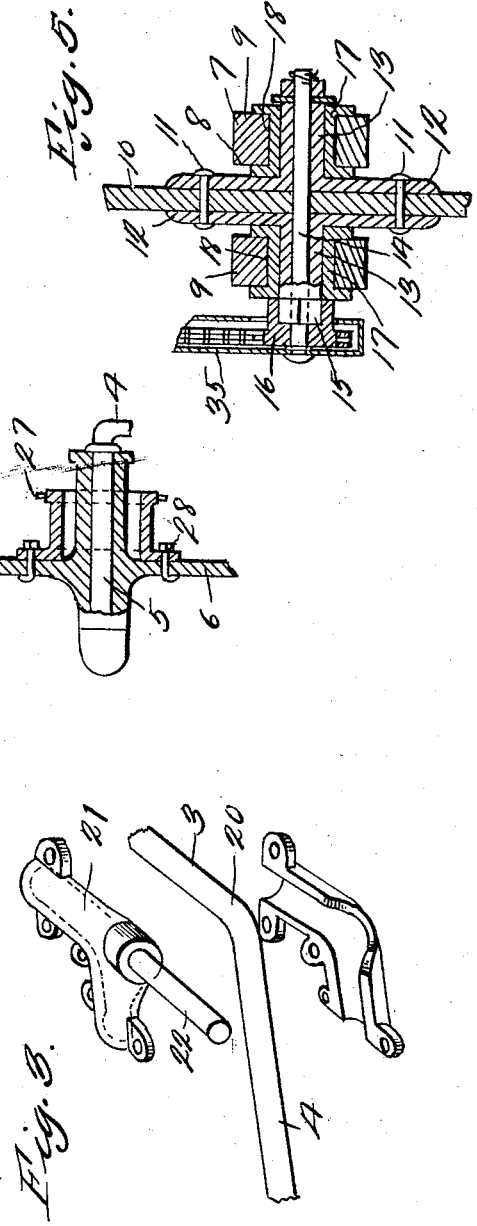
Inventor
F. D. Adamy
By Philip A. H. Purcell
Attorney Patented May 26, 1925.

1,539,066

UNITED STATES PATENT OFFICE.

FRANK D. ADAMY, OF BELLWOOD, NEBRASKA.

NONCLOG COLTER.

Application filed March 19, 1924. Serial No. 700,201.

*To all whom it may concern:*

Be it known that FRANK D. ADAMY, a citizen of the United States, residing at Bellwood, in the county of Butler and State of Nebraska, has invented certain new and useful Improvements in Nonclog Colters, of which the following is a specification, reference being had therein to the accompanying drawings.

The invention relates to tractor plows of the type having a plurality of bottoms wheel supported and adapted to be pulled by a tractor or other source of power, and has for its object to provide a device of this character wherein colters are disposed forwardly of the plowing elements, and rotated through driving connection with the ground engaging wheels of the plow. The rotation of the colters insure a positive discing action, and at the same time severing or breaking up obstructions, for instance corn stalks, manure, or any other trash that may come in contact therewith.

A further object is to provide the colters with notches, in which corn stalks or other obstructions may be gripped during the rotation of the colters, thereby insuring a cutting and crushing action, by the forcing of said material under the colter during the rotation thereof and consequently preventing clogging of material forwardly of the colter, during the forward movement of the plow as a whole.

A further object is to provide a tractor, sulky or gang plow tractor with revolving colters adjacent the plowing elements, which revolving colters have chain sprocket and shaft connections with the ground engaging wheels of the tractor plow, thereby insuring a positive rotation of the colters as the tractor plow is moved over the ground.

A further object is to provide separable brackets attached to the angled portions of the plow supporting axles, and provided with stub shafts in axial alignment with the frame carried portions of said axle, and sprockets on said stub shafts having sprocket and sprocket chain connections with the ground engaging wheels, and colter driving shafts.

The positioning of the stub shafts in relation to the axis of the axles allows rotation of the axles for raising or lowering the tractor plow frame, without interference from driving connections between the ground engaging wheels, the stub shafts and the colter driving shaft.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 2 is a side elevation of the tractor plow.

Figure 3 is a detail collective view of one of the stub shaft brackets, showing the parts in position to be assembled on the angular portion of one of the axles.

Figure 4 is a detail sectional view through a portion of one of the ground engaging wheels, showing the drive sprocket attached thereto.

Figure 5 is a detail sectional view through a portion of one of the colters, showing the method of applying a drive sprocket thereto.

Figure 1:
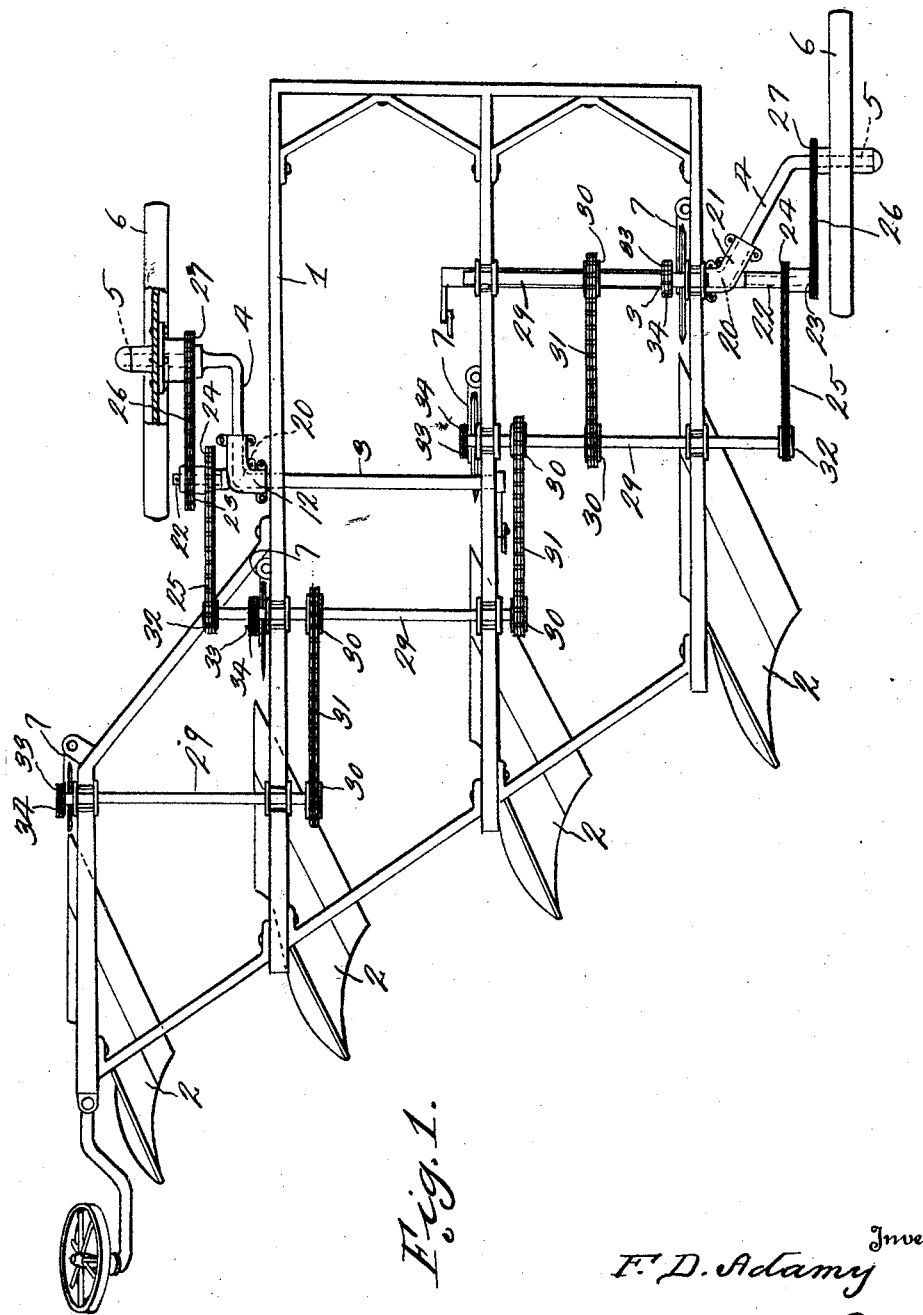
Figure 1 is a top plan view of the tractor plow, showing the colter driving mechanism applied thereto.

Referring to the drawings, the numeral 1 designates the frame of a conventional form of tractor plow, and for purposes of illustration, the tractor plow is provided with four plowing elements 2, however it is to be understood that the mechanism hereinafter set forth may be applied to any form of tractor plow, tho it is preferably applied to the gang plow type. The plow frame 1 is supported in the usual manner on rotatable axles 3, which axles are in parallel relation, and have their ends provided with angularly disposed arms 4, which arms terminate in parallel wheel spindles 5, on which are rotatably mounted the ground engaging wheels 6. The axles 3 may be controlled in any conventional manner, which will vary according to the type of plow, and no claim is made to any specific mechanism for rotating the axles 3 for raising and lowering the plow frame 1.

Extending downwardly from the frame 1 are rigid colter brackets 7, the lower ends of which have rotatably mounted in bifurcations 8 thereof, and between the arms 9, colters 10, which colters have secured to the opposite sides thereof by means of rivets 11, plates 12, which platters are provided with outwardly extending integral sleeves 13, through which the bolt 14 extends. The bolt 14 extends through the rectangular shaped end 15 of one of the sleeves 13, and through the colter drive sprocket 16, and securely holds said sprocket 16 on the rectangular shaped end 15 of the sleeve 13, and consequently when the sprocket 16 is rotated the colter 10 will rotate therewith. The sleeves 13 are preferably provided with bearing blocks 17, which are disposed in the apertures 18 of the arms 9 of the bracket 7, consequently the colters 10 are rotatably supported at all times. The construction of each colter is the same as above set forth, and all the colters are rotatably supported. The colters 10 rotate in the direction of the arrow a and are provided with a plurality of notches 19, which, during the rotation of the colters will grip corn stalks and the like, and insure a severing thereof by the colters, and at the same time, prevent dragging or collection of corn stalks, vine or the like, forwardly of the colters and consequently clogging thereof.

Secured to the angled portions 20 of the axles 3 are angularly shaped separable brackets 21, which brackets are provided with stub shafts 22, on which are mounted rotatably double sprockets 23 and 24. It will be seen that the stub shafts 22 are in axial relation with the axles 3, and consequently during the rotation of the axles 3 the sprocket chains 25 and 26 will not prevent the free movement of the angularly disposed portions 4 of the axles. The sprocket chains 26 extend over drive sprockets 27, which sprockets are provided with flanges 28, which are secured to the ground engaging wheels 6, and consequently the sprockets 27 rotate with the ground engaging wheels 6, therefore it will be seen that as the ground engaging wheels 6 move over the ground, rotation will be imparted to the sprockets 23 and 24. Rotatably mounted on the frame 1 are colter drive shafts 29, which drive shafts have sprocket and chain connections 30 and 31, whereby all of said shafts will be simultaneously rotated when one or more of said shafts 29 are rotated by means of sprocket chains 25, which extend over sprockets 32 carried thereby, and consequently it will be seen that power for rotating the shafts 29 is transmitted from the ground engaging wheel or wheels 6, and said shafts 29 will rotate whenever the tractor plow is moved. The shafts 29 are provided with sprockets 33, and extending around said sprockets 33 and the sprockets 16, which drive the colters 10 are sprocket chains 34; therefore it will be seen that whenever the ground engaging wheels 6 are rotated, the notched colters 10 will be rotated simultaneously therewith, thereby insuring severing of trash, corn stalks and the like, and preventing clogging.

From the above it will be seen that a tractor plow is provided with means for positively rotating colters carried thereby, which colters are notched, consequently clogging is obviated. It will also be seen that the colters are driven through sprocket and chain connections with the ground engaging wheels, and through stub shaft connections in axial alignment with the axles, thereby providing free movement of the wheels, without interference from the colter driving mechanism. It is to be understood that the number of shafts 29 will vary according to the type of tractor plow to which the device is applied, and the number of colters will vary. Also the above may vary as to location. All of the sprocket chains 34 and the sprockets 16, which drive the colters 10 are provided with casings 35 which extend upwardly to a point above the colters and form means for keeping trash from getting in the sprockets and chains. It is to be understood that the colters may be driven from one or more ground engaging wheels independent of each other, and not necessarily from more than one ground engaging wheel, where less than four colters are used.

It is also to be understood that this non-clogging colter mechanism may be applied to any standard make of sulky, gang or tractor plow, without changing any, or altering any part of the plow with the exception of colters. The drive sprocket 27 with flanges 28 are constructed in a manner whereby they will slip over inside hub of any standard plow wheel and fasten to spoke or any other convenient place without altering the wheel in the least.

The invention having been set forth what is claimed as new and useful is:—

1. The combination with a tractor plow, ground engaging wheels carried by said plow, axles rotatably mounted in the plow, angularly disposed arms carried by the axles, said ground engaging wheels being carried by the angularly disposed portions of the axles, brackets detachably connected to the axles and angularly disposed portions thereof, stub shafts carried by the brackets and axially disposed in relation to the axles, and sprocket and chain connections between the colters, stub shafts and ground engaging wheels.

2. The combination with a tractor plow, ground engaging wheels carried by angularly disposed portions of axles rotatably mounted, rotatable colters carried by said plow, of means for rotating said colters, said means comprising stub shafts carried by the axles in axial alignment therewith, double sprockets carried by said stub shafts, sprocket and sprocket chain connections between the double sprockets and the ground engaging wheels and sprocket and sprocket chain connections between the double sprockets and the rotatable colters.

3. The combination with a tractor plow having rotatable colters, ground engaging wheels, said ground engaging wheels being carried by offset portions of rockable axles, of means for rotating said colters upon a rotation of the ground engaging wheels, said means comprising a plurality of rotatable shafts, sprocket and chain connections between said shafts, sprocket and chain connections between the shafts and the colters, stub shafts carried by the axles in axial alignment therewith, and sprocket and chain connections between the stub shafts and the ground engaging wheels.

In testimony whereof I hereunto affix my signature.

FRANK D. ADAMY.